United States Patent
Matsumura et al.

(10) Patent No.: US 9,981,524 B2
(45) Date of Patent: May 29, 2018

(54) STABILIZER BUSHING AND BUSHING-EQUIPPED STABILIZER BAR USING THE SAME

(71) Applicants: SUMITOMO RIKO COMPANY LIMITED, Komaki-shi, Aichi (JP); TOYOTA JIDOSHA KABUSHIKI KAISHA, Toyota-shi, Aichi (JP)

(72) Inventors: Hiroyuki Matsumura, Komaki (JP); Satoshi Uchida, Toyota (JP); Masaki Shirashige, Toyota (JP); Toru Neichi, Okazaki (JP)

(73) Assignees: SUMITOMO RIKO COMPANY LIMITED, Komaki (JP); TOYOTA JIDOSHA KABUSHIKI KAISHA, Toyota (JP)

(*) Notice: Subject to any disclaimer, the term of this patent is extended or adjusted under 35 U.S.C. 154(b) by 0 days. days.

(21) Appl. No.: 15/231,380

(22) Filed: Aug. 8, 2016

(65) Prior Publication Data

US 2017/0080772 A1    Mar. 23, 2017

(30) Foreign Application Priority Data

Sep. 17, 2015 (JP) .................................. 2015-184099

(51) Int. Cl.
*F16F 1/16* (2006.01)
*B60G 21/055* (2006.01)
(Continued)

(52) U.S. Cl.
CPC ............ *B60G 21/0551* (2013.01); *F16F 1/16* (2013.01); *F16F 1/373* (2013.01); *F16F 3/12* (2013.01);
(Continued)

(58) Field of Classification Search
CPC ..... F16F 1/16; F16F 1/373; F16F 3/12; B60G 2204/1224; B60G 2204/41
See application file for complete search history.

(56) References Cited

U.S. PATENT DOCUMENTS 6,889,988 B2 * 5/2005 Cai .................... B60G 21/0551
                                                267/293
7,448,636 B2 * 11/2008 Johnson .................. B60G 3/20
                                                280/124.152
(Continued)

FOREIGN PATENT DOCUMENTS

EP         1953014 A1    8/2008
JP       S57-048334 U    3/1982
(Continued)

OTHER PUBLICATIONS

Aug. 1, 2017 Office Action issued in Japanese Application No. 2015-184099.
(Continued)

*Primary Examiner* — Faye M Fleming
(74) *Attorney, Agent, or Firm* — Oliff PLC (57) ABSTRACT

A stabilizer bushing including: a tubular main rubber elastic body configured to be disposed about and attachable to a stabilizer bar; an inside protrusion protruding in an axial direction from an inner peripheral part of the main rubber elastic body; and a bonding surface constituted by including an inner peripheral surface of the main rubber elastic body and an inner peripheral surface of the inside protrusion, the bonding surface being configured to be bonded to an outer peripheral surface of the stabilizer bar.

8 Claims, 5 Drawing Sheets

(51) Int. Cl.
*F16F 1/373* (2006.01)
*F16F 3/12* (2006.01)
(52) U.S. Cl.
CPC ............. *B60G 2204/1222* (2013.01); *B60G 2204/1224* (2013.01); *B60G 2204/41* (2013.01)

(56) References Cited

U.S. PATENT DOCUMENTS

| | | | |
|---|---|---|---|
| 8,424,891 B2 * | 4/2013 | Nagai | F16F 1/16 280/124.107 |
| 8,613,460 B2 | 12/2013 | Suwa et al. | |
| 2006/0091595 A1 | 5/2006 | Hayashi et al. | |
| 2008/0244861 A1 | 10/2008 | Miyamoto et al. | |

FOREIGN PATENT DOCUMENTS

| | | | | | |
|---|---|---|---|---|---|
| JP | H11-108094 A | | 4/1999 | | |
| JP | 2006-069234 A | | 3/2006 | | |
| JP | 2006-123818 A | | 5/2006 | | |
| JP | 2007331573 A | * | 12/2007 | ........... | B60G 21/055 |
| JP | 2008143376 A | * | 6/2008 | ........... | B60G 21/055 |
| JP | 2008-184081 A | | 8/2008 | | |
| JP | 2009018696 A | * | 1/2009 | ............. | B60G 3/14 |
| JP | 2009-073360 A | | 4/2009 | | |
| JP | 2010-137688 A | | 6/2010 | | |
| JP | 4759399 B2 | | 8/2011 | | |
| JP | 2011-168102 A | | 9/2011 | | |

OTHER PUBLICATIONS

Jan. 9, 2018 Office Action issued in Japanese Patent Application No. 2015-184099.

* cited by examiner

ID BUSHING AND
BUSHING-EQUIPPED STABILIZER BAR
USING THE SAME

INCORPORATED BY REFERENCE

The disclosure of Japanese Patent Application No. 2015-184099 filed on Sep. 17, 2015 including the specification, drawings and abstract is incorporated herein by reference in its entirety.

BACKGROUND OF THE INVENTION

1. Field of the Invention

The present invention relates to a stabilizer bushing constituting a stabilizer of a vehicle, and to a bushing-equipped stabilizer bar using the same.

2. Description of the Related Art

A stabilizer has been provided in vehicles including automobiles to stabilize their postures for improvement in driving stability and controllability. The stabilizer stabilizes the posture of the vehicle by torsion reaction force of the stabilizer bar. The both edge parts of the stabilizer bar are attached to the left and right suspension arms on the side of the wheels, while the medium part of the stabilizer bar is attached on the side of the vehicle body via the stabilizer bushing. Under a great difference of displacement amount between the left and right suspension arms, the torsion reaction force of the stabilizer bar restrains the displacement of the left and right suspension arms. This reduces the vehicle roll and thus stabilizes the posture.

The stabilizer bushing that attaches the medium part of the stabilizer bar on the side of the vehicle body has a tubular main rubber elastic body. This stabilizer bushing connects the stabilizer bar and the vehicle body to one another using its elasticity, by being disposed about and attached to the stabilizer bar and by being attached on the side of the vehicle body via an outer bracket, which is superposed on its outer peripheral surface of the stabilizer bushing.

Although the stabilizer bushing can be disposed about the stabilizer bar without being bonded thereto, the inner peripheral surface of the main rubber elastic body may be bonded to the outer peripheral surface of the stabilizer bar to further improve the driving stability and the controllability and prevent entry of debris into the gap between the stabilizer bushing and the stabilizer bar. For example, Japanese Unexamined Patent Publication No. JP-A-2011-168102 discloses a structure wherein the inner peripheral surface of the main rubber elastic body is adhered to the outer peripheral surface of the stabilizer bar with an adhesive.

However, the stabilizer bar to which the stabilizer bushing is adhered may suffer from durability deterioration. Static stress due to the attachment of the stabilizer bushing to the vehicle body and the stabilizer bar and dynamic stress due to vibration input concentrate on the axial edge parts of the inner peripheral surface of the main rubber elastic body. This results in such a durability deterioration factor as great tensile strain, which may cause cracking in the main rubber elastic body.

SUMMARY OF THE INVENTION

It is therefore one object of the present invention to provide a stabilizer bushing of a novel structure, which is able to exhibit excellent performance owing to bonding thereof to the stabilizer bar with enough durability.

It is another object of the present invention to provide a bushing-equipped stabilizer bar including the above-described stabilizer bushing bonded to the stabilizer bar.

The above and/or optional objects of this invention may be attained according to at least one of the following modes of the invention. The following modes and/or elements employed in each mode of the invention may be adopted at any possible optional combinations.

A first mode of the present invention provides a stabilizer bushing comprising: a tubular main rubber elastic body configured to be disposed about and attachable to a stabilizer bar; an inside protrusion protruding in an axial direction from an inner peripheral part of the main rubber elastic body; and a bonding surface constituted by including an inner peripheral surface of the main rubber elastic body and an inner peripheral surface of the inside protrusion, the bonding surface being configured to be bonded to an outer peripheral surface of the stabilizer bar.

For the stabilizer bushing with this structure according to the first mode, the inner peripheral surface of the main rubber elastic body is bonded to the outer peripheral surface of the stabilizer bar. This prevents sliding of the stabilizer bushing relative to the stabilizer bar in the peripheral direction and the length direction, thereby yielding higher performance. This also prevents entry of debris into the gap between the stabilizer bushing and the stabilizer bar.

The inside protrusion is formed at the inner peripheral part of the main rubber elastic body to protrude in the axial direction. The inner peripheral surface of the inside protrusion is bonded to the outer peripheral surface of the stabilizer bar. Such an inside protrusion disperses stress concentration on the axial edge parts of the inner peripheral surface of the main rubber elastic body resulting from the bonding of the main rubber elastic body to the stabilizer bar. This dispersion improves the durability of the main rubber elastic body.

A second mode of the present invention provides the stabilizer bushing according to the first mode, wherein the inside protrusion is positioned apart toward an inner peripheral side from an outer peripheral edge in an axial end face of the main rubber elastic body.

With the second mode, the formation part of the inside protrusion is limited to the part apart toward the inner peripheral side from the outer peripheral edge of the axial end face of the main rubber elastic body. This makes it possible to advantageously obtain stress concentration moderation effect owing to the inside protrusion for the inner peripheral part of the main rubber elastic body, while restraining an effect of the inside protrusion on spring characteristics of the main rubber elastic body. In addition, it is possible to form the inside protrusion using a small amount of forming material.

A third mode of the present invention provides the stabilizer bushing according to the first or second mode, wherein the inside protrusion is gradually thinner toward a protrusion tip of the inside protrusion.

According to the third mode, with the inner peripheral surface of the inside protrusion being bonded to the outer peripheral surface of the stabilizer bar, the outer peripheral surface of the inside protrusion provides a tapered shape having its diameter gradually reduced toward the projection tip. The inside protrusion of this shape disperses the stress for the axial edge parts of the main rubber elastic body more favorably.

A fourth mode of the present invention provides the bushing-equipped stabilizer bar comprising: a stabilizer bar; and the stabilizer bushing according to any one of the first to third modes, the main rubber elastic body of the stabilizer bushing is disposed about and attached to the stabilizer bar, and the inner peripheral surface of the main rubber elastic body and the inner peripheral surface of the inside protrusion are bonded to an outer peripheral surface of the stabilizer bar.

With the fourth mode, the stabilizer bushing is bonded to the stabilizer bar. This arrangement avoids the performance deterioration and noise generation and other adverse effects due to sliding, as well as the entry of debris into the gap between the stabilizer bushing and the stabilizer bar. Moreover, providing the stabilizer bushing with the inside protrusion improves the durability of the main rubber elastic body. This contributes to provision of the bushing-equipped stabilizer bar with excellent reliability.

According to the present invention, the inner peripheral surfaces of the main rubber elastic body and the inside protrusion are bonded to the outer peripheral surface of the stabilizer bar, thereby improving the performance of the stabilizer. In addition, the inside protrusion disperses the stress acting on the axial edge parts of the inner peripheral surface of the main rubber elastic body, thereby keeping enough durability of the main rubber elastic body.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

There will be described below an embodiment of the present invention while referring to the drawings.

FIGS. 1 to 6 show a stabilizer bushing 10 as a first embodiment of the present invention. The stabilizer bushing 10 has a main rubber elastic body 12 and an adjustment member 14 that is vulcanization adhered to the main rubber elastic body 12. In the descriptions hereafter, the up-down direction means the up-down direction in FIG. 1, the front-back direction means the up-down direction in FIG. 2, and the left-right direction means the left-right direction in FIG. 1, which is the axial direction.

More specifically, the main rubber elastic body 12 has a tubular shape as a whole, and includes an attachment hole 16 penetrating therethrough in the left-right direction with a circular cross section, as shown in FIGS. 3 to 6. The main rubber elastic body 12 has a slit 18 in at least one portion on the periphery, thereby dividing the peripheral wall of the attachment hole 16 in the peripheral direction at the slit 18. The both front and back surfaces and the upper surface of the main rubber elastic body 12 have a groove opening toward the outer periphery and extending continuously. The both edge parts in the left-right direction protrude toward the outer periphery further than the central part for the main rubber elastic body 12. Especially for the upper half part of the outer peripheral surface of the main rubber elastic body 12, the central part in the left-right direction receding toward the inner periphery includes a pair of left and right concave grooves 20, 20 which extend in the peripheral direction along the both edge parts in the left-right direction further protruding to the outer periphery. The pair of left and right concave grooves 20, 20 have the same shape as one another in the present embodiment, although they can have different shapes.

The main rubber elastic body 12 integrally includes a pair of left and right inside protrusions 22, 22. Each inside protrusion 22 in a tubular shape protrudes at the radially inner part of the main rubber elastic body 12 from the respective axial end face thereof toward the outside in the axial direction as shown in FIGS. 1-3 and 5, 6. In the present embodiment, the inside protrusion 22 is positioned at the radially inner part where is apart from the outer peripheral edge in the axial end face of the main rubber elastic body 12. This inside protrusion 22 protrudes to the axial outside of the compression section of the main rubber elastic body 12 between a stabilizer bar 30 and an outer bracket 42 and a vehicle body 40 which will be described later. In a state of the bushing-equipped stabilizer bar being mounted to the vehicle, as will be described later, an outer peripheral surface 26 of the inside protrusion 22 is a free surface under no direct constraint by a metal fitting etc.

An inner peripheral surface 24 of the inside protrusion 22 is a round tubular surface extending in the left-right direction with a substantially constant diameter, which is roughly the same in dimension as the inner diameter of the main rubber elastic body 12. On the other hand, the outer peripheral surface 26 of the inside protrusion 22 is tapered with a gradually smaller diameter toward the protrusion tip. Consequently, the inside protrusion 22 is gradually thinner in the radial direction toward the protrusion tip.

The inside protrusion 22 of the present embodiment has the outer peripheral surface 26 inclined to the axial end face of the outer peripheral part of the main rubber elastic body 12 at an angle of $\theta$ ($0°<\theta<90°$, preferably $10°\leq\theta\leq60°$, and more desirably $20°\leq\theta\leq40°$). As clear from this, the axial end face of the outer peripheral part of the main rubber elastic body 12 and the outer peripheral surface 26 of the inside protrusion 22 constituting the axial end face of the inner peripheral part of the main rubber elastic body 12 are formed at different angles and thus inclined relative to one another. The axial protrusion dimension 1 of the inside protrusion 22 from the main rubber elastic body 12 is desirably not greater than the half of the thickness T of the main rubber elastic body 12 in the radially front-back direction. The maximum radial thickness t of the inside protrusion 22 is desirably not greater than the thickness T' of the main rubber elastic body 12 in the axial end face in the radially front-back direction, and more preferably not greater than the half of the thickness T'. In short, the inside protrusion 22 is desirably formed only at the radially inner part where is apart from the outer peripheral edge in the axial end face of the main rubber elastic body 12.

Figure 1:
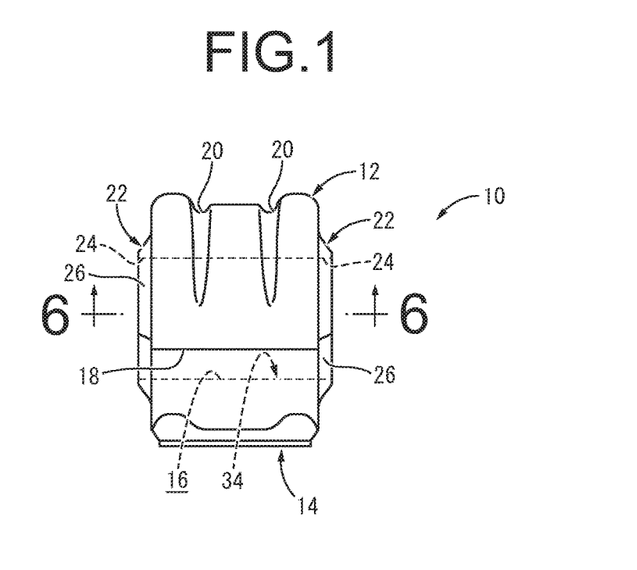
FIG. 1 is a front view showing a stabilizer bushing as a first embodiment of the present invention.
Figure 2:
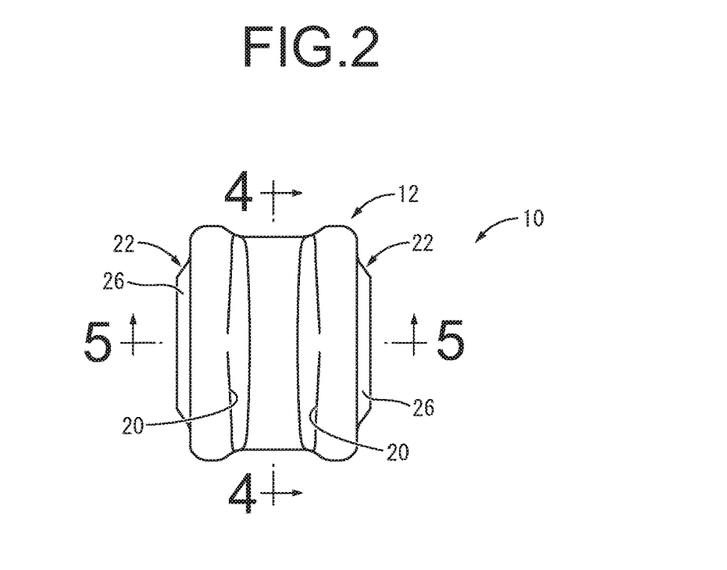
FIG. 2 is a plan view of the stabilizer bushing shown in FIG. 1.
Figure 3:
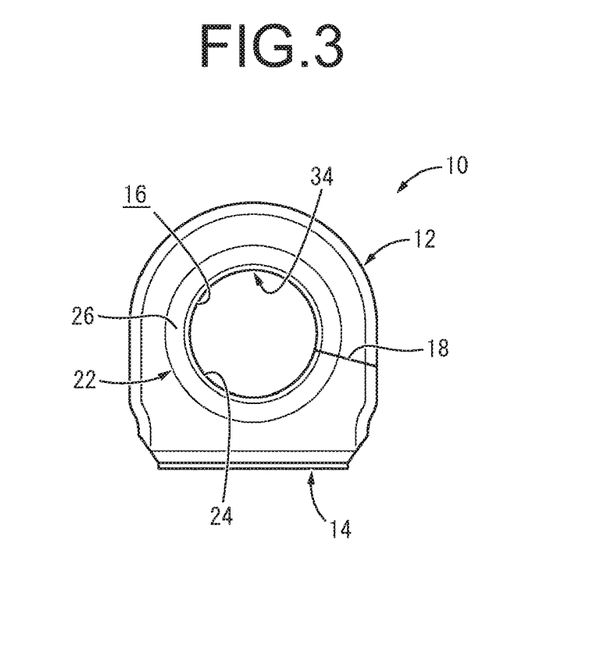
FIG. 3 is a left side view of the stabilizer bushing shown in FIG. 1.
Figure 4:
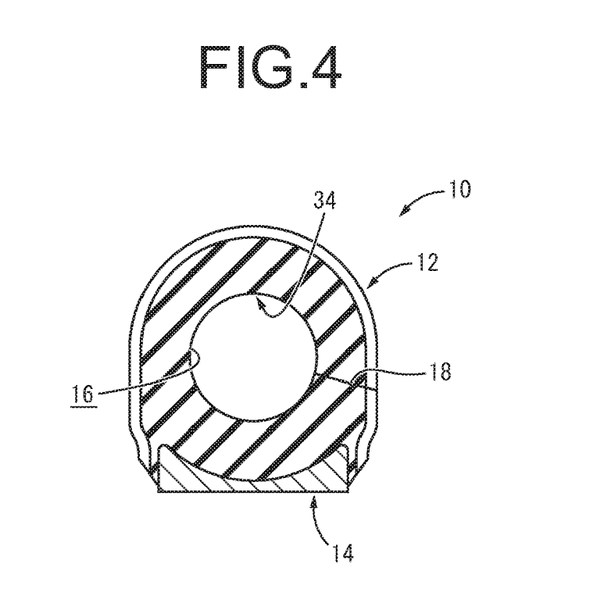
FIG. 4 is a cross section view taken along line 4-4 of FIG. 2.
Figure 5:
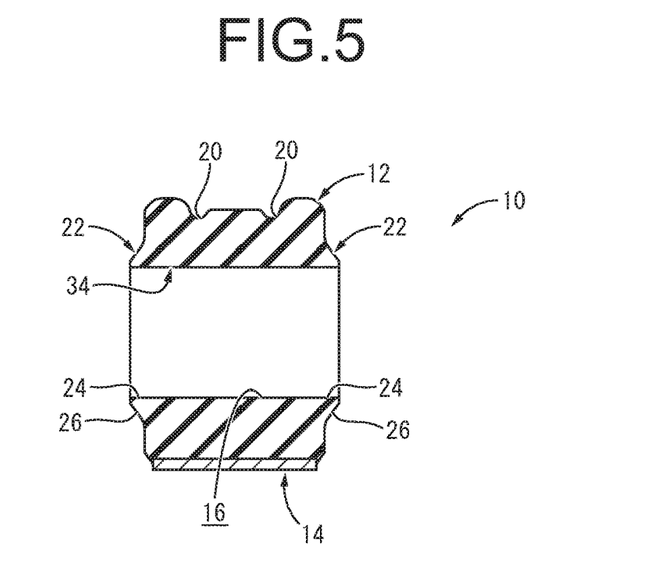
FIG. 5 is a cross section view taken along line 5-5 of FIG. 2.
Figure 6:
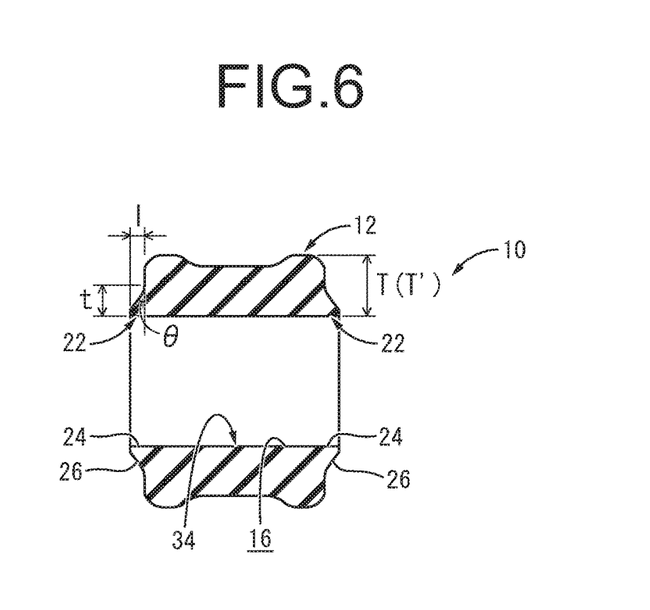
FIG. 6 is a cross section view taken along line 6-6 of FIG. 1.

To the main rubber elastic body 12, the adjustment member 14 is bonded. The adjustment member 14, which is formed of a metal like an aluminum alloy, a rigid synthetic resin or another material, is adhered by vulcanization to the lower end part of the main rubber elastic body 12. The adjustment member 14 has a curving upper face that curves in the peripheral direction of the main rubber elastic body 12 in a recess shape opening upward and a plane lower face, so that it becomes gradually thicker toward the left-right outside as shown in FIG. 4. In this embodiment, the upper face of each end of the adjustment member 14 in the left-right direction has a cross section in a substantial arc convex upward, and thus the upper face and the left and right side faces of the adjustment member 14 are smoothly continuous without having points. The lower end part of the adjustment member 14 including the lower face is exposed to the downside from the main rubber elastic body 12.

Figure 7:
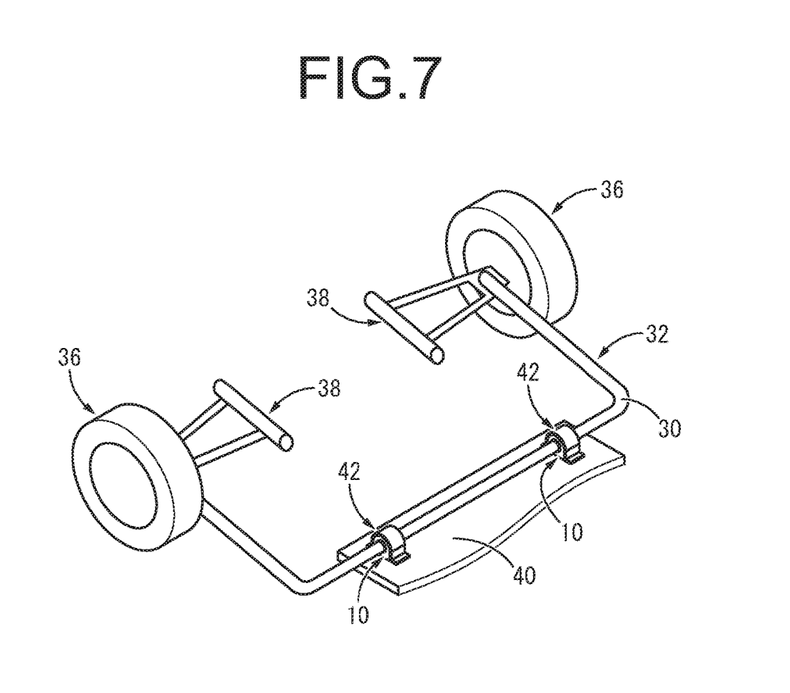
FIG. 7 is a view showing a vehicle-mounted state of a bushing-equipped stabilizer bar including the stabilizer bushing shown in FIG. 1.

The stabilizer bushing 10 of this structure is attached to the medium part of the stabilizer bar 30 to constitute a bushing-equipped stabilizer bar 32 as shown in FIG. 7. More specifically, the bushing-equipped stabilizer bar 32 includes the stabilizer bar 30 of a substantial U shape of spring steel and two stabilizer bushings 10, 10 that are attached to the medium part of the stabilizer bar 30 as mutually apart in the left-right direction.

The stabilizer bar 30 is inserted into the attachment hole 16 of the stabilizer bushing 10 via the slit 18 of the main rubber elastic body 12, whereby the stabilizer bushing 10 is attached to the stabilizer bar 30 with the main rubber elastic body 12 disposed about the stabilizer bar 30. The inner peripheral surface of the main rubber elastic body 12 of the stabilizer bushing 10 constitutes a bonding surface 34 to be superposed and bonded to the outer peripheral surface of the stabilizer bar 30. Consequently, the main rubber elastic body 12 is disposed about and bonded to the stabilizer bar 30. Although the bonding means for the main rubber elastic body 12 and the stabilizer bar 30 is not limited to a particular means, bonding methods for the molded stabilizer bushing 10 including adhesive-adhesion and vulcanization-adhesion can be used preferably.

The bonding surface 34 to be superposed on and bonded to the outer peripheral surface of the stabilizer bar 30 is constituted by including the inner peripheral surfaces 24, 24 of the inside protrusions 22, 22, which protrude from the axial end faces of the main rubber elastic body 12. That is, the inner peripheral surfaces 24, 24 of the inside protrusions 22, 22 are superposed on and bonded to the outer peripheral surface of the stabilizer bar 30. The bonding means for the inside protrusions 22, 22 and the stabilizer bar 30 is free from any limitation as well as the bonding means for the main rubber elastic body 12 and the stabilizer bar 30, and it is possible to adopt later-bonding methods including adhesion, and vulcanization-adhesion etc., for example.

In the present embodiment, the part of the stabilizer bar 30 where the stabilizer bushing 10 is attached has a larger diameter than the inner diameter of the main rubber elastic body 12. Therefore, the insertion of the stabilizer bar 30 into the attachment hole 16 of the main rubber elastic body 12 expands the attachment hole 16 of the main rubber elastic body 12 radially outwardly, whereby the inner peripheral surface of the attachment hole 16 is more likely to cling to the outer peripheral surface of the stabilizer bar 30.

Figure 8:
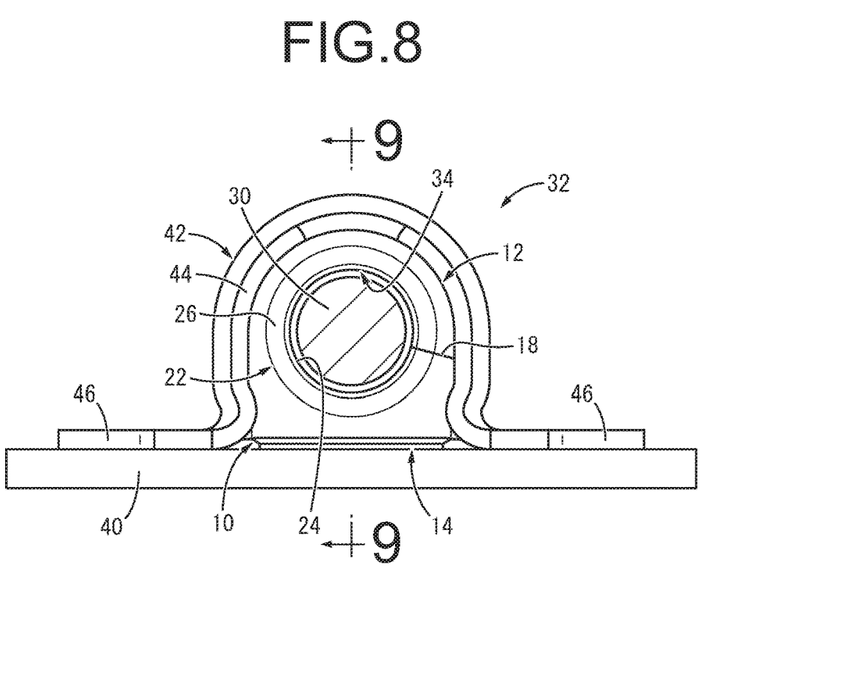
FIG. 8 is a cross section view showing a principal part of the vehicle-mounted bushing-equipped stabilizer bar shown in FIG. 7, taken along line 8-8 of FIG. 9.
Figure 9:
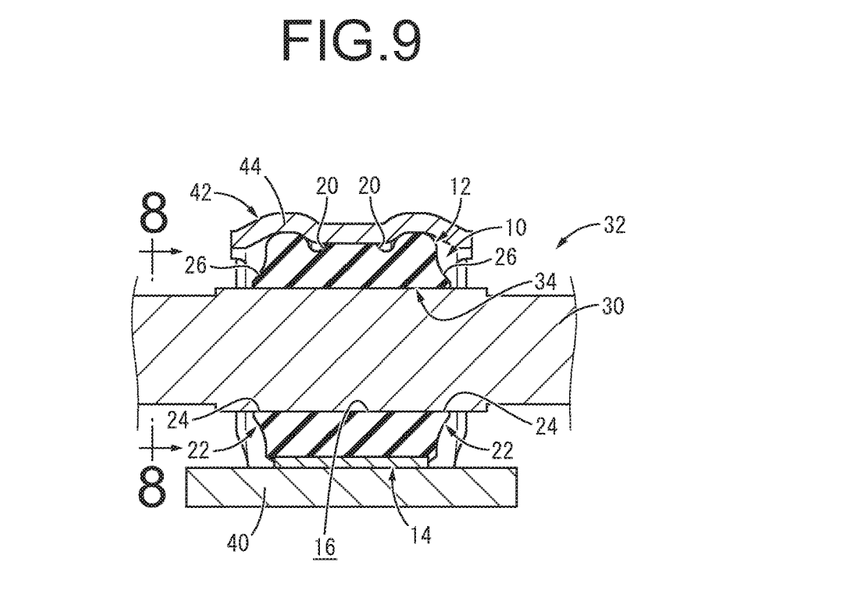
FIG. 9 is a cross section view taken along line 9-9 of FIG. 8.

The bushing-equipped stabilizer bar 32 of the structure wherein the stabilizer bushings 10, 10 are attached to the stabilizer bar 30 is mounted to the vehicle as shown in FIGS. 7 to 9. Specifically, each edge part of the stabilizer bar 30 is mounted to the respective one of left and right suspension arms 38, 38 on the side of wheels 36, while the medium part of the stabilizer bar 30 is mounted to the vehicle body 40 by the stabilizer bushings 10, 10. Each stabilizer bushing 10 is mounted to the vehicle body 40 via the outer bracket 42, which is attached to the outer peripheral surface of the main rubber elastic body 12.

The outer bracket 42 is a high rigidity member formed of a metal, a rigid fiber-reinforced synthetic resin, or another material, including a groove-shaped attachment part 44 to be superposed to the upper face and the both front and back side faces of the main rubber elastic body 12, as shown in FIGS. 8 and 9. The both left and right end parts of the attachment part 44 protrude to the outer periphery further than the central part in the left-right direction, with a curved shape convex toward the outer periphery. The boundary part between each of the left and right end parts and the central part in the left-right direction in the attachment part 44 is folded to be convex to the inner peripheral side. The lower opening end of the attachment part 44 has a curved shape convex to the inside in the front-back direction, thereby connecting the attachment part 44 to a mounting piece 46 smoothly at the boundary. The lower end of the attachment part 44 integrally has a pair of mounting pieces 46, 46 projecting to the respective outside in the front-back direction. The mounting piece 46 has a not-shown bolt hole penetrating therethrough in the up-down direction, which enables the mounting piece 46 to be fixed to the vehicle body 40 with a not-shown bolt inserted into the bolt hole.

The mounting pieces 46, 46 of the outer bracket 42 are bolt-fixed to the vehicle body 40 with the attachment part 44 of the outer bracket 42 superposed to the outer peripheral surface (the upper face and the both front and back side faces) of the main rubber elastic body 12, and with the lower face of the adjustment member 14 superposed to the vehicle body 40. Thus, the stabilizer bushing 10 is mounted to the vehicle body 40, so that the medium part of the stabilizer bar 30 is mounted to the vehicle body 40 via the stabilizer bushing 10. The mounting piece 46 may be fixed to the vehicle body 40 with other means than bolt fixing, such as rivet junction, swaging, and welding.

The outer bracket 42 is fixed to the vehicle body 40 in this way, thereby compressing the main rubber elastic body 12 between the outer bracket 42 and the vehicle body 40. Moreover, the outer bracket 42 is mounted to the vehicle body 40 after the insertion of the stabilizer bar 30, thereby compressing the main rubber elastic body 12 radially between the stabilizer bar 30 and the attachment part 44 of the outer bracket 42 and the vehicle body 40 (via the adjustment member 14).

In this mounting state with the compression of the main rubber elastic body 12, the opening end inner peripheral edge of the attachment part 44 of the outer bracket 42 may touch the main rubber elastic body 12. This touch does not cause problems like cracking in the main rubber elastic body 12, owing to the curved shape of the opening end of the attachment part 44. In addition, the folded parts formed in the attachment part 44, which are convex to the inner peripheral side, correspond in position to the openings of the concave grooves 20, 20 in the main rubber elastic body 12 as shown in FIG. 9. This avoids damages of the main rubber elastic body 12 caused by abutment of the folded parts against the main rubber elastic body 12.

The inner peripheral surface of the main rubber elastic body 12 is bonded to the outer peripheral surface of the stabilizer bar 30. The resultant radial compression causes the axial end faces of the main rubber elastic body 12 to bloat to the axial outside, so that tensile stress acts on the axial ends of the inner peripheral surface of the main rubber elastic body 12. For the stabilizer bushing 10 according to this embodiment, the inside protrusions 22, 22 formed integrally at the inner peripheral part of the main rubber elastic body 12 reduce the deformation of the main rubber elastic body 12 to the axial outside, while efficiently causing the radial compression. This eliminates generation of cracking in the axial ends of the inner peripheral surface of the main rubber elastic body 12, and thus improves the durability.

Especially in the present embodiment, the inside protrusion 22 protrudes to the axial outside of a part that corresponds in the axis-perpendicular direction to the bonding section to the outer bracket 42 in the outer peripheral surface of the main rubber elastic body 12 (corresponding to the inner peripheral surface of the main rubber elastic body 12 in this embodiment). Therefore, forces exerted on the stabilizer bushing 10 by the outer bracket 42 such as fastening force and prizing force are not exerted directly to the tip part of the inside protrusion 22. Moreover, in the present embodiment, the inside protrusion 22 is gradually thinner in the radial direction toward the protrusion tip, tapering the outer peripheral surface 26 thereof. This decreases the tensile stress acting on the axial end faces of the main rubber elastic body 12, which results from the radial compression, more effectively. Consequently, troubles, e.g., cracking generation in the axial end faces of the main rubber elastic body 12, are avoided to improve the durability.

The inner peripheral surface 24 of the inside protrusion 22, in the stabilizer bushing 10 alone before the attachment to the stabilizer bar 30, is a circular tubular surface extending in the axial direction without tilting, continuously to the inner peripheral surface of the main rubber elastic body 12, which is also a circular tubular surface. As a result, the inside protrusion 22, under expansion accompanying the insertion of the stabilizer bar 30, has little unevenness like wrinkles on the inner peripheral surface 24 due to the deformation, so that the inside protrusion 22 is effectively bonded to the stabilizer bar 30.

The main rubber elastic body 12 is bonded to the stabilizer bar 30. This makes it possible to obtain the target effects including stable vehicle posture and excellent riding comfort without suffering from such problems as shift of the stabilizer bushing 10, spring action deterioration, and noise generation due to stick slip, which are caused by sliding of the stabilizer bushing 10 relative to the stabilizer bar 30 in the length direction or the peripheral direction. The bonding of the main rubber elastic body 12 to the stabilizer bar 30 avoids entry of debris like water and dust into the gap between them, thereby preventing the noise generation and the durability deterioration due to corrosion of the stabilizer bar 30. In addition, the whole bonding surface 34 constituted by the inner peripheral surface of the main rubber elastic body 12 and the inner peripheral surfaces 24, 24 of the inside protrusions 22, 22 is bonded to the outer peripheral surface of the stabilizer bar 30. This eliminates or reduces deterioration of the bonding part by contact of debris, as well as detachment of the bonding part from the stabilizer bar 30. Especially, the protrusion tip of the inside protrusion 22 has an annular plane tip face expanding in the axis-perpendicular direction, thereby securing a certain extent of thickness and deformation rigidity accordingly. Consequently, the inside protrusion 22 is bonded to the outer peripheral surface of the stabilizer bar 30 up to the protrusion tip with enough strength.

In the present embodiment, the inside protrusion 22 is provided at the radially inner portion where is apart from the outer peripheral edge in the axial end face of the main rubber elastic body 12. That is, the inside protrusion 22 is provided partially in the radial direction, and is located more inside than the radially middle of the main rubber elastic body 12. This enables the inside protrusions 22 to improve the durability for the axial ends of the inner peripheral surface of the main rubber elastic body 12, which frequently suffers from stress concentration due to the bonding of the main rubber elastic body 12 to the stabilizer bar 30, while scarcely affecting the spring characteristics of the main rubber elastic body 12 to yield the target characteristics.

Although the embodiment of the present invention has been described above, the present invention is not limited by the specific description. For example, the inside protrusion 22 can be provided protruding only from one of the axial end faces of the main rubber elastic body 12. For the inside protrusions 22 protruding from the both axial end faces of the main rubber elastic body 12, they can have different shapes.

The structure of the inside protrusion should not be interpreted as limited by the specific examples shown in the aforementioned embodiment. For example, the outer peripheral surface of the inside protrusion can have an untapered shape that extends straightly in the axial direction with a substantially constant diameter. The inner peripheral surface of the inside protrusion before the bonding to the stabilizer bar can have a tapered shape with a larger or smaller diameter toward the protrusion tip. This tapered inner peripheral surface may be tapered either as a whole or in part, e.g., in the protrusion tip only. In addition, the inside protrusion need not have a constant cross section across the entire periphery in the peripheral direction, i.e., it can have the protrusion height and the cross sectional shape vary in the peripheral direction.

As long as being provided in the inner peripheral part of the main rubber elastic body, the inside protrusion can be provided such that the outer peripheral end of the base end thereof is positioned at the outer peripheral end of the main rubber elastic body, for example. In short, the formation section of the inside protrusion in the main rubber elastic body is not limited to its inner peripheral part, but can extend from its inner peripheral end to its outer peripheral end.

The specific structure of the main rubber elastic body is under no limitation. For example, it is possible to use the main rubber elastic body that is divided in two by formation of slits at two portions on the periphery. However, the slit is not an essential feature in the present invention, but dispensable if the main rubber elastic body can be disposed about and attached to the stabilizer bar by another way.

The adjustment member 14 can be omitted depending on the required characteristics, and the stabilizer bushing can be constituted only by the main rubber elastic body. The stabilizer bushing without the adjustment member 14 can have the main rubber elastic body disposed also in the section where the adjustment member 14 is disposed in the aforesaid embodiment. The specific shape and material of the adjustment member can be changed as appropriate depending on the required characteristics. For example, the adjustment member can be a pair of upper and lower half-tubular metal fittings. Such metal fittings may be bonded to the main rubber elastic body substantially across one periphery as buried therein.

The specific configuration etc. of the stabilizer bar is under no limitation and various known structures can be used therefor.

What is claimed is:

1. A stabilizer bushing comprising:
a tubular main rubber elastic body configured to be disposed about and attachable to a stabilizer bar;
an inside protrusion protruding in an axial direction from an inner peripheral part of the main rubber elastic body, an axial end face of an outer peripheral part of the main rubber elastic body and an outer peripheral surface of the inside protrusion being inclined relative to each other, an entirety of the inside protrusion being spaced from an outer peripheral edge in an axial end face of the main rubber elastic body; and
a bonding surface constituted by including an inner peripheral surface of the main rubber elastic body and an inner peripheral surface of the inside protrusion, the bonding surface being configured to be bonded to an outer peripheral surface of the stabilizer bar.

2. A stabilizer bushing comprising:
a tubular main rubber elastic body configured to be disposed about and attachable to a stabilizer bar;
an inside protrusion protruding in an axial direction from an inner peripheral part of the main rubber elastic body; and
a bonding surface constituted by including an inner peripheral surface of the main rubber elastic body and an inner peripheral surface of the inside protrusion, the bonding surface being configured to be bonded to an outer peripheral surface of the stabilizer bar,
wherein the inside protrusion is thinner toward a protrusion tip of the inside protrusion, and an entirety of the inside protrusion is spaced from an outer peripheral edge in an axial end face of the main rubber elastic body.

3. A bushing-equipped stabilizer bar comprising:
a stabilizer bar; and
the stabilizer bushing according to claim 1, wherein
the main rubber elastic body of the stabilizer bushing is disposed about and attached to the stabilizer bar, and the inner peripheral surface of the main rubber elastic body and the inner peripheral surface of the inside protrusion are bonded to an outer peripheral surface of the stabilizer bar.

4. The stabilizer bushing according to claim 1, wherein the axial end face of the outer peripheral part of the main rubber elastic body is substantially perpendicular to an axial direction of the stabilizer bushing.

5. The stabilizer bushing according to claim 1, wherein the outer peripheral surface of the inside protrusion is inclined relative to the axial end face of the outer peripheral part of the main rubber elastic body at a substantially constant angle greater than 0 degrees and less than 90 degrees.

6. The stabilizer bushing according to claim 1, wherein the outer peripheral surface of the inside protrusion is inclined relative to the axial end face of the outer peripheral part of the main rubber elastic body at a substantially constant angle at least 10 degrees and no more than 60 degrees.

7. The stabilizer bushing according to claim 1, wherein the outer peripheral surface of the inside protrusion is inclined relative to the axial end face of the outer peripheral part of the main rubber elastic body at a substantially constant angle at least 20 degrees and no more than 40 degrees.

8. The stabilizer bushing according to claim 1, wherein a maximum radial thickness of the inside protrusion is not more than half a maximum radial thickness of the main rubber elastic body.

* * * * *